United States Patent
Cho et al.

(10) Patent No.: US 8,586,187 B2
(45) Date of Patent: Nov. 19, 2013

(54) ADHESIVES FOR BONDING POLYURETHANE AND ALUMINUM

(75) Inventors: Hyun Chul Cho, Seoul (KR); Seong Hoon Lee, Ulsan (KR); Dai Soo Lee, Seoul (KR); Ki Ho Kang, Jeonbuk (KR)

(73) Assignee: Hyundai Motor Company, Seoul (KR)

( * ) Notice: Subject to any disclaimer, the term of this patent is extended or adjusted under 35 U.S.C. 154(b) by 210 days.

(21) Appl. No.: 13/180,830

(22) Filed: Jul. 12, 2011

(65) Prior Publication Data

US 2012/0288721 A1    Nov. 15, 2012

(51) Int. Cl.
| | |
|---|---|
| *B32B 27/08* | (2006.01) |
| *B32B 27/40* | (2006.01) |
| *C07F 7/02* | (2006.01) |
| *C10B 53/00* | (2006.01) |

(52) U.S. Cl.
USPC ........ 428/425.5; 428/447; 428/450; 556/413; 556/443; 201/19

(58) Field of Classification Search
USPC .............. 556/413, 443; 428/425.5, 447, 450, 428/457; 201/19
See application file for complete search history.

(56) References Cited

U.S. PATENT DOCUMENTS

| | | | |
|---|---|---|---|
| 7,893,170 B2 | 2/2011 | Wakioka et al. | |
| 2011/0060086 A1* | 3/2011 | Rodgers et al. | 524/424 |
| 2011/0143101 A1* | 6/2011 | Sandhu | 428/195.1 |
| 2012/0202047 A1* | 8/2012 | Welch et al. | 428/323 |

FOREIGN PATENT DOCUMENTS

| | | | | |
|---|---|---|---|---|
| CN | 102002161 A | * | 4/2011 | ............ C08G 77/04 |
| JP | 2010144022 A | | 7/2010 | |
| KR | 10-0391303 | | 1/2003 | |
| KR | 10-2008-0078833 | | 8/2008 | |
| KR | 10-2008-0089385 | | 10/2008 | |
| KR | 10-2009-0130005 | | 12/2009 | |
| KR | 1020100050252 A | | 5/2010 | |

* cited by examiner

*Primary Examiner* — Thao T. Tran
(74) *Attorney, Agent, or Firm* — Edwards Wildman Palmer LLP; Peter F. Corless

(57) ABSTRACT

The present invention provides an adhesive comprising graphene oxide including at an epoxy group, a hydroxyl group or a carboxylic acid group; and an alkoxysilane compound including an amine group, an epoxy group, a carboxylic acid group, a hydroxyl group, or a thiol group. More specifically the adhesive may be used for bonding a polyurethane elastomer to an aluminum material, in which a silane compound and graphene oxide are applied to improve adhesive strength, compared to adhesives including the silane compound only. In addition, during a separation process for recycling after use, the aluminum material and polyurethane can be easily separated from each other by polyurethane pyrolysis through rapid heating due to microwave absorption properties of graphene oxide.

4 Claims, 2 Drawing Sheets

ADHESIVES FOR BONDING POLYURETHANE AND ALUMINUM

CROSS-REFERENCE TO RELATED APPLICATION

This application claims under 35 U.S.C. §119(a) the benefit of Korean Patent Application No. 10-2011-0045309 filed May 13, 2011, the entire contents of which are incorporated herein by reference.

BACKGROUND (a) Technical Field

The present invention relates to an adhesive for bonding polyurethane to aluminum.

(b) Background Art

Recently, there have been developments in an environment-friendly technology for the manufacture of light-weight tires with low rolling resistance for improving fuel efficiency vehicles. Mainly, the tire rolling resistance has been reduced by applying a silica filler within tire treads, but this technology has reached a saturation point and no further improvements have been realized recently. Accordingly, non-pneumatic tires made of urethane materials have been under development by leading global companies to achieve improved low rolling resistance and lightweightness.

However, when using urethane, adhesion of the urethane to an aluminum material is required due to its structure which is considerably different from those of the conventional tires. Thus, it is necessary to develop adhesives having improved adhesion performance in order for this adhesion to occur properly.

Further, in light of environment-friendliness, there is a need for the development of a technology enabling easy separation of the urethane materials from used-up products in the course of collecting and recycling of the products.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an adhesive capable of improving adhesive strength between urethane and aluminum material, and if necessary, capable of easily separating the urethane from the aluminum material during deconstruction.

In a preferred embodiment, the present invention provides an adhesive comprising graphene oxide consisting of either an epoxy group, a hydroxyl group or a carboxylic acid group; and an alkoxysilane compound consisting of either an amine group, an epoxy group, a carboxylic acid group, a hydroxyl group, or a thiol group on its surface.

In another aspect, the present invention provides a polyurethane-aluminum composite material that is adhered by the adhesive, and a method for separating the same.

In a preferred embodiment, the present invention provides an aluminum-urethane composite material that is adhered by the adhesive.

In another preferred embodiment, the present invention provides a method for separating an aluminum-polyurethane composite material, comprising the step of radiating microwave into the aluminum-urethane composite material.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
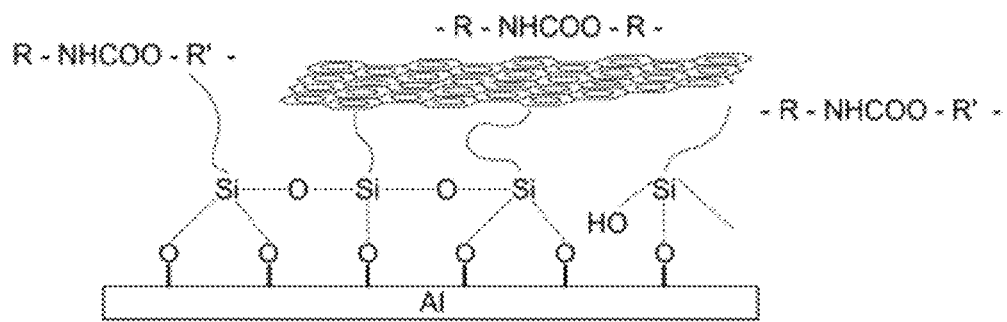
FIG. 1 is a conceptual diagram showing adhesion of an adhesive of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to an adhesive comprising graphene oxide including an epoxy group, a hydroxyl group or a carboxylic acid group; and an alkoxysilane compound including an amine group, an epoxy group, a carboxylic acid group, a hydroxyl group, or a thiol group. The graphene oxide may be a conventional graphene oxide prepared by ultrasonic exfoliation after mechanical exfoliation or chemical treatment of graphite. The graphene oxide consists of either an epoxy group, a hydroxyl group or a carboxylic acid group on its surface. This functional group allows for a reaction with an isocyanate group of the prepolymers used in the preparation of a polyurethane elastomer. In the following exemplary Reaction Schemes 1 and 2, alkoxy groups of alkoxy silane react with water to form silanol, which binds to the hydroxyl group on the surface of aluminum by sol-gel reaction under acidic conditions.

$$Si-(OC_2H_5)_3 + 3H_2O \rightarrow Si-(OH)_3 + 3C_2H_5OH \quad \text{[Reaction Scheme 1]}$$

[Reaction Scheme 2]

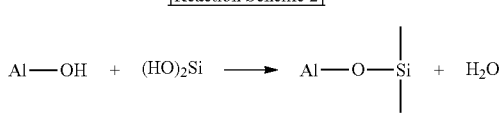

Moreover, as shown in Reaction Schemes 3 and 4, the amine group of aminosilane reacts with the epoxy group of graphene oxide to produce a hydroxyl group, and the produced hydroxyl group or secondary amine group is linked to polyurethane by urethane formation reaction with the isocyanate group of prepolymers used in the preparation of polyurethane elastomer.

[Reaction Scheme 3]

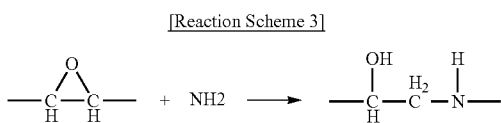

[Reaction Scheme 4]

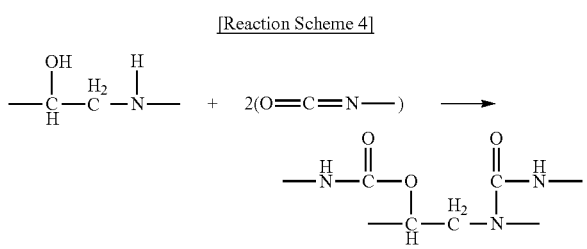

The silane compound may be various compounds such as glycidyl propyl trimethoxy silane (GPTMS), amino propyl trimethoxy silane (APTMS), and mercapto propyl trimethoxy silane. It may be defined as a silane compound that is characterized by including alkoxy groups capable of binding to aluminum via a sol-gel reaction and a group reactive with the epoxy group, hydroxyl group, or carboxylic acid group of the graphene oxide.

A conceptual diagram showing adhesion of the adhesive of the present invention is shown in FIG. 1. 50~99 wt % of the graphene oxide and 1~50 wt % of the alkoxysilane compound may be included. If the content of the graphene oxide is less than 50 wt %, there may be a problem in polyurethane pyrolysis through microwave absorption during a separation process for recycling after use.

In addition, the present invention relates to an aluminum-polyurethane composite material that is adhered by the adhesive. Further, the present invention relates to a method for separating an aluminum-polyurethane composite material, comprising the step of heating the aluminum-polyurethane composite material. The heating may be preformed by means of microwave radiation. In particular, the microwave radiation may be performed for about 10 sec~30 min at about 500~1000 watts.

EXAMPLES

The following examples illustrate the invention and are not intended to limit the same.

Preparation Example

Preparation of Graphene Oxide

Natural graphite was treated by Hummer's method using potassium permanganate, sulfuric acid, hydrogen peroxide or the like, and then subjected to ultrasonic exfoliation to prepare graphene oxide. The prepared graphene oxide was analyzed using an elemental analyzer (model: Vario MICRO-Cube, manufactured by Elementalar Analysensysteme GmbH, Germany), and the result showed that the content was carbon of 69.9 wt %, hydrogen of 1.0 wt %, nitrogen of 1.2 wt %, sulfur of 2.3 wt %, and oxygen of 25.5 wt %.

Example, Comparative Example

Graphene oxide was dispersed in a mixture of ethanol/water (in a volume ratio of 95/5) to prepare a solution of 1 wt %, and then a silane compound was added to the graphene oxide prepared in Preparation Example in an amount described in the following Table 1, and stirred at room temperature for 6 hrs for the reaction between the functional groups of the silane compound and graphene oxide, thereby preparing an adhesive for adhesion between aluminum and polyurethane.

TABLE 1

| (part by weight) | Ex. 1 | Ex. 2 | Ex. 3 | Ex. 4 | Comp. Ex. 1 | Comp. Ex. 2 |
|---|---|---|---|---|---|---|
| APTMS | 50 | — | 10 | 40 | 100 | — |
| GPTMS | — | 50 | 40 | 10 | — | 100 |
| Graphene oxide | 50 | 50 | 50 | 50 | — | — |

TEST EXAMPLES

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

Test Example 1

Evaluation of Adhesion Performance

A weak acetic acid aqueous solution was added to the prepared adhesive solution until the acidity reached a pH of 5, and then sprayed on an aluminum sample, and dried at about 90° C.

Figure 2:
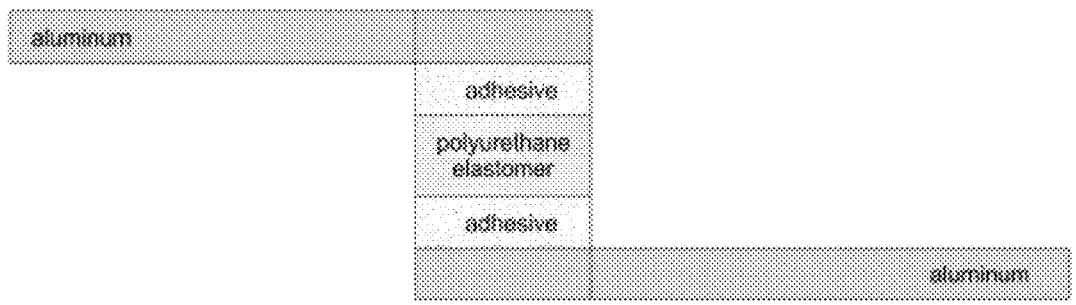
FIG. 2 is a conceptual diagram of a sample for evaluation of adhesive strength between aluminum and polyurethane.

For the preparation of a polyurethane elastomer to evaluate adhesive strength between the aluminum material and polyurethane elastomer, poly (tetramethylene ether glycol) with a weight average molecular weight of about 2000 and methylene bis-4, 4 diphenylene diisocyanate were used to prepare a liquid polyurethane prepolymer containing 10 wt % of isocyanate. The polyurethane prepolymer was applied to the aluminum sample coated with the adhesive, and then adhered to the other aluminum sample coated with the adhesive so as to prepare a sample for the evaluation of lap shear adhesion, as illustrated in FIG. 2. The polyurethane prepolymer was cured in an oven at about 120° C. to prepare a sample for the evaluation of adhesive strength.

Figure 3:
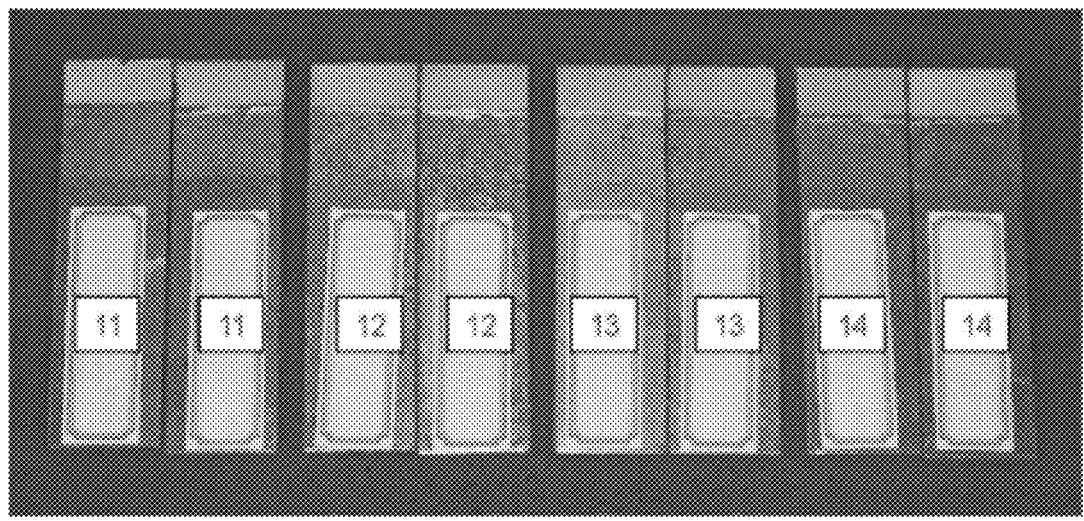
FIG. 3 shows fracture-cross sections of samples adhered by using the adhesives of Examples 1~4, in which the fracture-cross sections are represented by 11~44.

The results of adhesive strength test are shown in Table 2. The fracture-cross sectional view of a sample adhered by using the adhesive of Example 1 is shown in FIG. 3. In the photograph, the upper white portion is a fracture-cross section of polyurethane and the lower part is aluminum.

TABLE 2

|  | Ex. 1 | Ex. 2 | Ex. 3 | Ex. 4 | Comp. Ex. 1 | Comp. Ex. 2 |
| --- | --- | --- | --- | --- | --- | --- |
| Lap shear adhesive strength (MPa) | 7.3 | 7.0 | 7.4 | 7.2 | 5.2 | 5.9 |
| Note | Cohesive failure | Cohesive failure | Cohesive failure | Cohesive failure | Cohesive failure | Cohesive failure |

In Examples 1~4, addition of graphene oxide showed an increase in adhesive strength having a reinforcing effect, as compared to Comparative Examples 1~2 without addition of graphene oxide.

Test Example 2

Separation of Composite Material

Figure 4:
FIG. 4 is a photograph showing separation of the sample of Example 1.

A sample prepared by adhering polyurethane and aluminum material using the adhesive prepared in Example 1, as in Test Example 1, was radiated with microwave in a 700 watt microwave oven for 10 min. FIG. 4 is a photograph of Example 1 that was easily separated by degradation of polyurethane due to microwave radiation. It was found that the separation was easily accomplished due to degradation of polyurethane.

EFFECT OF THE INVENTION

The present invention provides to an adhesive for bonding a polyurethane elastomer to an aluminum material, in which a silane compound and graphene oxide are applied to improve adhesive strength, compared to adhesives including the silane compound only. In addition, during a separation process for recycling after use, the aluminum material and polyurethane can be easily separated from each other by polyurethane pyrolysis through rapid heating due to microwave absorption properties of graphene oxide.

What is claimed is:

1. An adhesive composition for bonding a polyurethane elastomer to an aluminum material, comprising 50~99 wt % of graphene oxide including an epoxy group, a hydroxyl group or a carboxylic acid group; and 1~50 wt % of an alkoxysilane compound including an amine group, an epoxy group, a carboxylic acid group, a hydroxyl group, or a thiol group.

2. The adhesive composition of claim 1, wherein the alkoxysilane compound including an amine group, an epoxy group, a carboxylic acid group, a hydroxyl group, or a thiol group is one of a group consisting of glycidyl propyl trimethoxy silane, amino propyl trimethoxy silane, or mercapto propyl trimethoxy silane.

3. An aluminum-polyurethane composite material that is adhered using an adhesive comprising graphene oxide including at least one of a group consisting of an epoxy group, a hydroxyl group or a carboxylic acid group; and an alkoxysilane compound including at least one of a group consisting of an amine group, an epoxy group, a carboxylic acid group, a hydroxyl group, or a thiol group.

4. A method for separating an aluminum-polyurethane composite material of claim 3, comprising:
   radiating microwaves into an aluminum-polyurethane composite material to thereby degrade the polyurethane material.

* * * * *